(12) United States Patent
Schu et al.

(10) Patent No.: US 6,262,774 B1
(45) Date of Patent: Jul. 17, 2001

(54) METHOD AND CIRCUIT CONFIGURATION FOR PRODUCING A SEQUENCE OF PROGRESSIVE IMAGES

(75) Inventors: Markus Schu, Erding; Günter Scheffler, München, both of (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/323,564

(22) Filed: Jun. 1, 1999

Related U.S. Application Data

(63) Continuation of application No. PCT/DE97/02496, filed on Oct. 27, 1997.

(51) Int. Cl.⁷ ............................. H04N 7/01; H04N 11/20
(52) U.S. Cl. ............................. 348/448; 348/452
(58) Field of Search ..................... 348/448, 449, 348/450, 451, 452, 459, 458, 441; H04N 7/01, 11/20

(56) References Cited

U.S. PATENT DOCUMENTS

| | | |
|---|---|---|
| 5,488,421 * | 1/1996 | Hwang et al. ................. 348/448 |
| 5,793,435 * | 8/1998 | Ward et al. ................... 348/448 |

FOREIGN PATENT DOCUMENTS

| | | |
|---|---|---|
| 4220662A1 | 1/1994 | (DE) . |
| 4434728C1 | 11/1995 | (DE) . |
| 0318760A2 | 6/1989 | (EP) . |
| 0318760A3 | 6/1989 | (EP) . |
| 0598333A1 | 5/1994 | (EP) . |
| 0679022A2 | 10/1995 | (EP) . |
| 0727904A2 | 8/1996 | (EP) . |

* cited by examiner

Primary Examiner—Michael H. Lee
(74) Attorney, Agent, or Firm—Herbert L. Lerner; Laurence A. Greenberg; Werner H. Stemer

(57) ABSTRACT

Virtually complete freedom from flicker is achieved by converting a line-interlaced 50/60 Hz video signal to a progressive 100/120 Hz video signal. For this purpose, the video signal on the input side is first converted to a 100/120 Hz signal with line-interlaced fields, and the progressive video signal is then produced from the first converted signal taken together with the non-converted input signal.

8 Claims, 3 Drawing Sheets

METHOD AND CIRCUIT CONFIGURATION FOR PRODUCING A SEQUENCE OF PROGRESSIVE IMAGES

CROSS-REFERENCE TO RELATED APPLICATION

This is a continuation of copending International application PCT/DE97/02496, filed Oct. 27, 1997, which designated the United States.

BACKGROUND OF THE INVENTION

1. Field of the Invention

The invention relates to a method for converting an input image sequence composed of line-interlaced half-frames at a first repetition frequency to an output image sequence composed of progressive images at a second repetition frequency, which is twice the first. The invention also relates to a circuit configuration for such a conversion.

In order to produce a television picture which is as free of flicker as possible, previous solution approaches are based on the conversion of the signal which is transmitted at the transmitter end and contains line-interlaced fields at a field repetition frequency of 50 or 60 Hz to a field sequence at a field repetition frequency of 100 or 120 Hz, respectively. Such a conversion is described, for example, in European published patent application EP 0 727 904 A2. Other methods provide for the conversion to an image sequence composed of progressive images at a frame refresh rate of 50 or 60 Hz, in which case the progressive images contain the entire number of lines. That method is described, for example, in European published patent application EP 0 679 022 A2.

Flicker effects are still perceptible both with field sequences at 100/120 Hz and with progressive image sequences at 50/60 Hz. In the former case, the edge flickering is admittedly reduced, but it is not completely corrected. Furthermore, line wandering may still occur. In the latter method, the large-area flickering is not completely surpressed.

SUMMARY OF THE INVENTION

It is accordingly an object of the invention to provide a method and a circuit for producing a sequence of progressive images, which overcomes the above-mentioned disadvantages of the heretofore-known devices and methods of this general type and which provide for improved freedom from flickering.

With the foregoing and other objects in view there is provided, in accordance with the invention, an image conversion method, which comprises:

receiving an input image sequence composed of line-interlaced fields at a first repetition frequency;

converting the input image sequence to an output image sequence composed of progressive images at a second repetition frequency double the first repetition frequency; by producing from the input image sequence an intermediate image sequence composed of line-interlaced fields at the second repetition frequency;

filtering the fields in the intermediate image sequence and the fields in the input image sequence and producing therefrom the progressive images of the output image sequence.

The frame refresh rate of the progressive images according to the invention is twice the input frequency, that is to say 100 or 120 Hz. As a consequence, edge and large-area flickering are located outside the spectrum that is responsible for the human eye perceiving flickering, and are no longer perceptible by the human eye. The picture is thus virtually completely flicker-free.

The conversion to the intermediate image sequence and to the intermediate video signal with line-interlaced fields at twice the input field frequency is known per se. Appropriate circuitry implementations are thus commercially available. The conversion step originating from the to progressive images at twice the repetition frequency requires only relatively simple filter operations, such as median filtering, but, in particular, no additional image storage complexity. Movement information which can possibly be used is already available from the known conversion method to the intermediate image sequence, and can be adopted for the subsequent progressive conversion.

In accordance with an added feature of the invention, the progressive images in the output image sequence are formed with lines in a first raster position and lines in a second raster position, and successive fields of the intermediate image sequence are each formed only with lines in a different raster position.

In accordance with an additional feature of the invention, in each case one image in the intermediate image sequence and in the output image sequence can be assigned to a movement phase of one of the images in the input image sequence and in each case one further image in the intermediate image sequence and in the output image sequence can be assigned to a further movement phase located between these movement phases, in that the lines of an image in the intermediate image sequence are transferred into the lines in the corresponding raster position in the respective image in the output image sequence of the same movement phase, and in that one of the pixels in the lines in the other raster position of this image in the output image sequence is obtained by means of filtering to which, on the input side, at least one pixel in a line (which is adjacent in terms of position to the pixel to be produced) in the image of the same movement phase in the intermediate image sequence is supplied as well as a pixel at a point which corresponds in terms of position to the pixel to be produced in that image of the input image sequence which, in the movement phase, is closest to the image of the output image sequence.

In accordance with another feature of the invention, each of the image sequences is split into one image sequence having a high signal element containing high-frequency image elements and having a low signal element containing low-frequency image elements, and those pixels are weighted from the input image sequence that are in the same raster position in comparison to the pixel to be produced more highly on the input side for the high signal element in the filtering if movement is found as compared to when no movement is found.

In accordance with a preferred embodiment of the invention, the filtering is median filtering.

In accordance with again an added feature of the invention, the median filtering step comprises supplying a first pixel to a median filter for the high signal element, the first pixel being taken from the field assigned to the intermediate image sequence in the movement phase on the line positionally adjacent to the pixel to be produced from the output image, taking a second pixel from the field in the input image sequence closest to the image of the output image sequence in the movement phase, from a point positionally corresponding to the pixel to be produced, together with the second pixel, if no movement is found, and a fixed value, if movement is found.

With the above and other objects in view there is provided, in accordance with the invention, a circuit configuration for converting an input image sequence composed of line-interlaced fields at a first repetition frequency to an output image sequence composed of progressive images, comprising:

an input receiving an input video signal of an input image sequence composed of line-interlaced fields at a first repetition frequency;

a converter connected to the input for converting the input video signal into an intermediate video signal including an intermediate image sequence composed of line-interlaced fields at a second repetition frequency; and an output device connected to the converter for producing from the input video signal and the intermediate video signal an output video signal with an output image sequence composed of progressive images.

In accordance with a concomitant feature of the invention, the converter comprises a first image memory receiving the input video signal and outputting a first video signal at a double frame refresh rate, and a second image memory connected to receive from the first image memory the first video signal and outputting a second video signal delayed by one field relative to the first video signal, an intermediate video signal generator having an input connected to the first image memory and the second image memory for generating from the first and second video signals the intermediate video signal, and wherein the output device for producing the output video signal has an input connected an output of the first and second image memories and to an output of the generator.

Other features which are considered as characteristic for the invention are set forth in the appended claims.

Although the invention is illustrated and described herein as embodied in method and circuit configuration for producing a sequence of progressive images, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
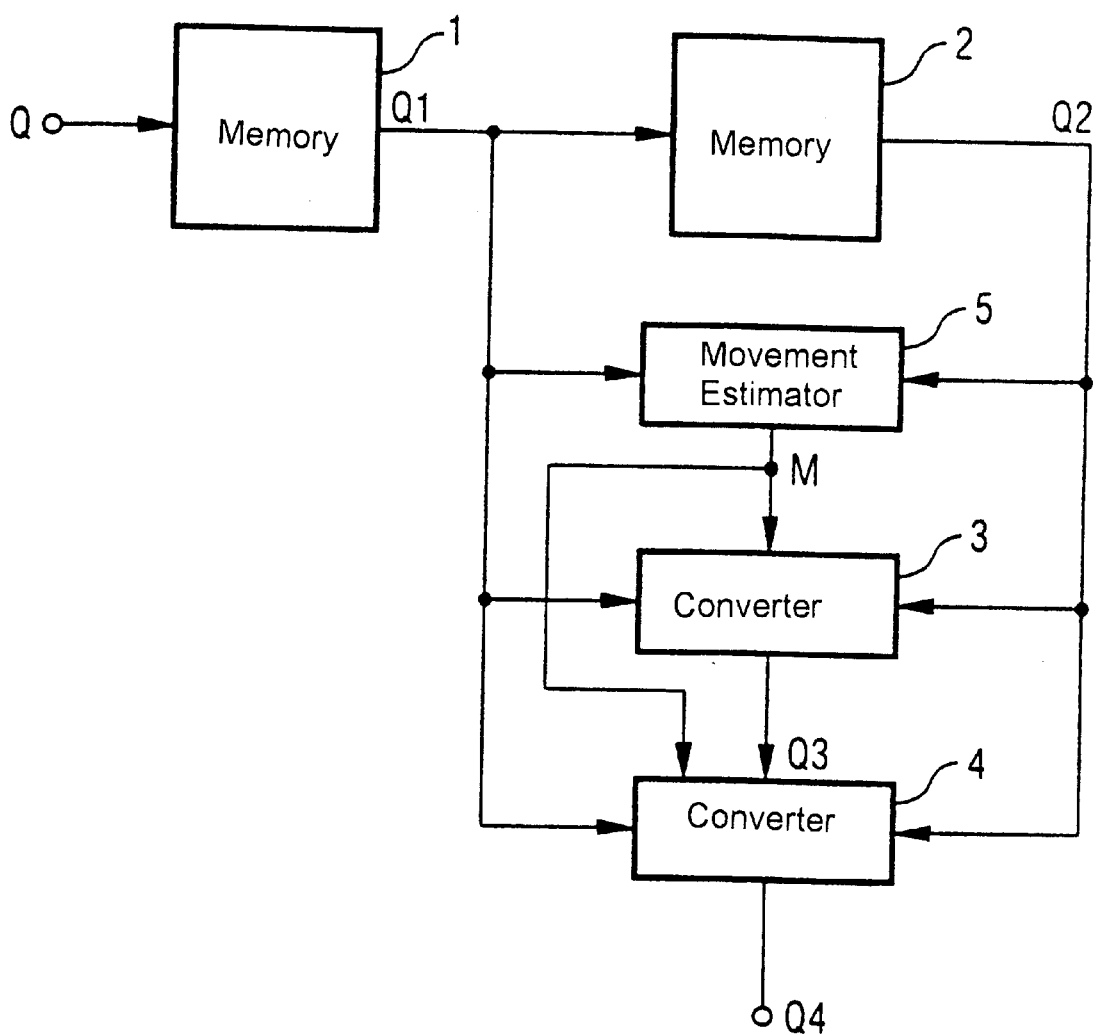
FIG. 1 is a block diagram for implementation of the present invention.

Referring now to the figures of the drawing in detail and first, particularly, to FIG. 1 thereof, a video signal Q is present on the input side. The video signal Q contains line-interlaced fields at intervals of 20 ms (50 Hz field repetition frequency). The first field A1 contains, for example, the odd-numbered lines, and the second field B2 contains the even-numbered lines, that is to say the fields are line-interlaced. The sequence thus comprises the fields, A1, B1, A2 . . . The video signal Q is buffer-stored in a field memory 1. On the output side, this is read at twice the field frequency or line frequency. The video signal Q1 has the field sequence A1, A1, B1, B1, A2, A2, . . . The signal Q1 is delayed in a further field memory 2. The video signal Q2 on the output side relating to this has the corresponding field sequence, but delayed by one field.

Figure 2:
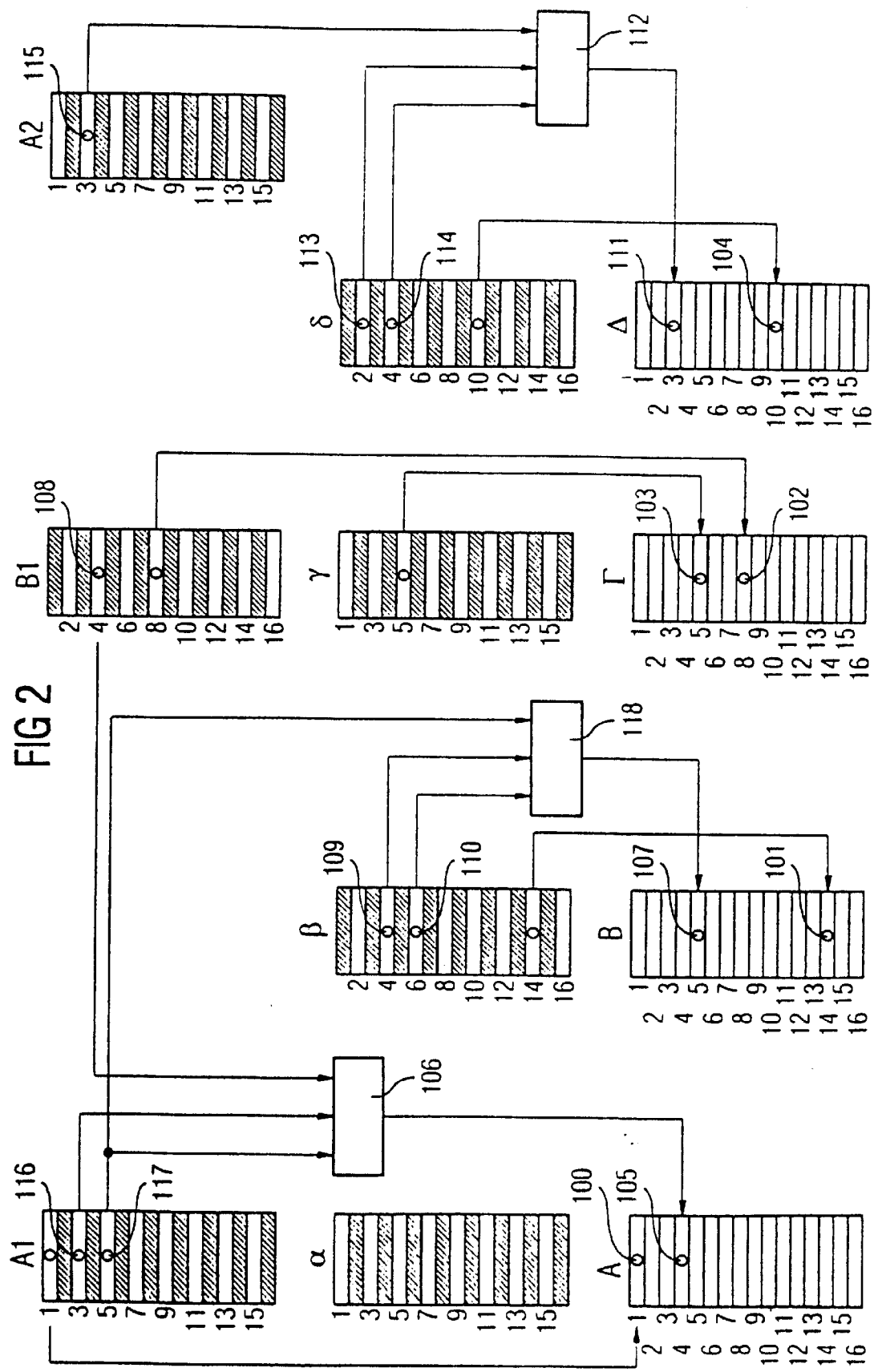
FIG. 2 is a schematic sequence of conversion steps for the low-frequency signal element.
Figure 3:
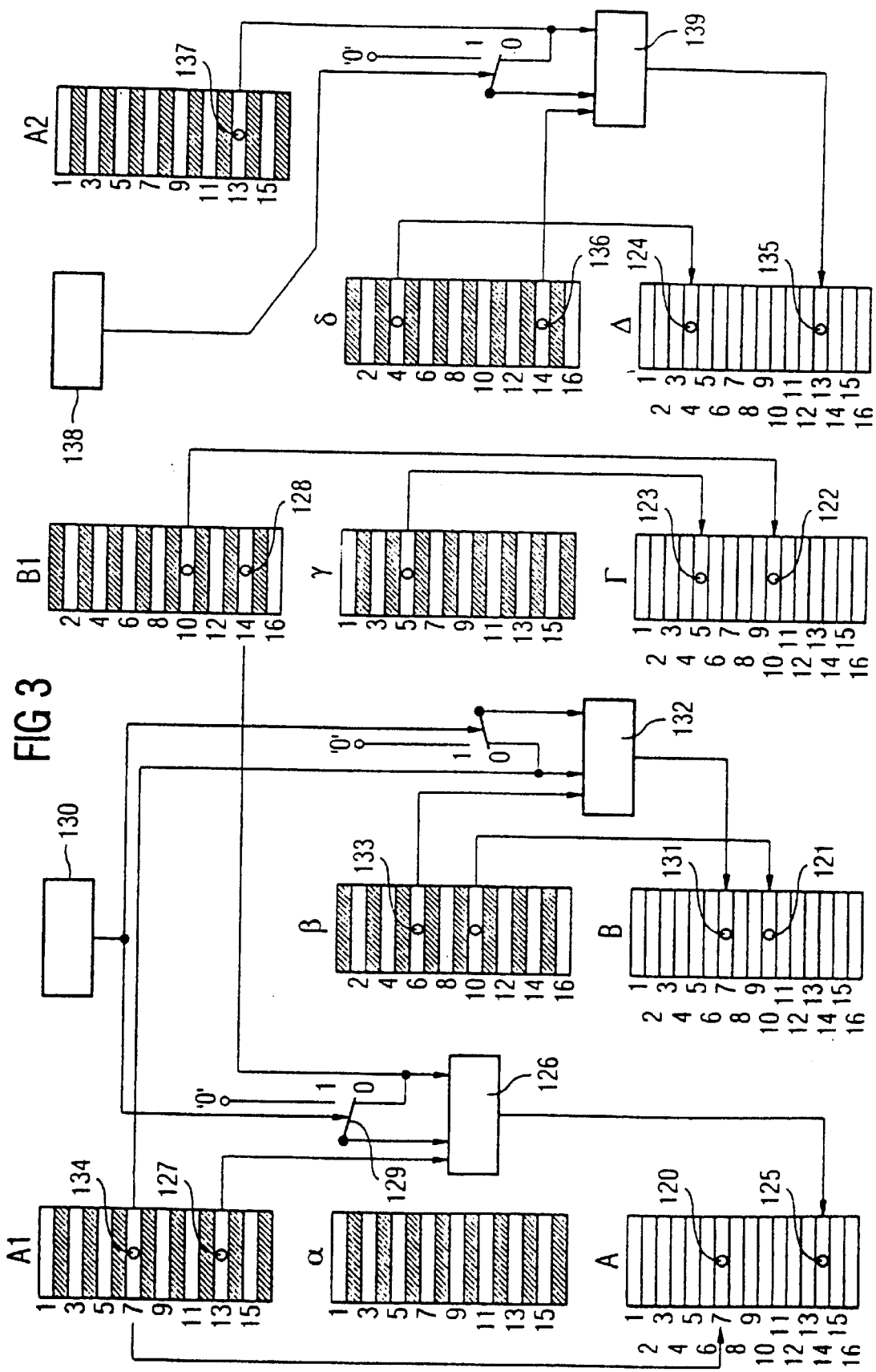
FIG. 3 is a schematic sequence of conversion steps for the high-frequency signal element.

The signals Q1, Q2 are supplied to a device 3 which is used to carry out a conversion—as described in more detail in FIGS. 2 and 3—of the field sequence of the video signal Q on the input side to an intermediate image sequence of the intermediate video signal Q3, which has line-interlaced fields at a repetition frequency of 100 Hz. The device 3, which may be referred to as the generator in the circuit, is used to produce the fields in the correct raster and movement phase from the signals Q1, Q2. The conversion is expediently carried out with movement compensation. To this end, a movement estimator 5 determines movement vectors pixel-by-pixel for successive fields (between A1, B1; between B1, A2, etc.) and supplies these to the device 3.

The intermediate video signal Q3 and the signals Q1, Q2, which already exist at the 100 Hz level, are used in a conversion device 4 to produce the video signal Q4 which can be picked off on the output side and has progressive images at a repetition frequency of 100 Hz. In order to carry out the conversion from the video signals Q1, Q2, Q3 expediently with movement compensation, the device 4 is also supplied with the movement vectors M.

The high and low signal elements are advantageously carried out separately during the conversion, both to the intermediate signal Q3 and to the progressive output signal Q4 for the high and low signal element. To this end, the video signal on the input side is split into a high signal element and a low signal element, separate signal processing is then carried out in the high channel and low channel, and the conversion results are then additively combined once again.

The conversion illustrated in FIG. 2 is carried out in the low channel. The line-interlaced field sequence A1, B1, A2 from the input side is used to produce the intermediate field sequence α, β, γ, δ with line-interlaced fields at twice the field repetition frequency. The lines which are shown as being dark are not used in the respective fields. Successive fields have lines in a different raster position. The field α contains the odd-numbered lines 1, 3, 5, . . . , the field β contains the even-numbered lines, the field γ contains the odd-numbered lines, etc. These fields are produced in the correct raster and with the correct movement phase for conversion of the fields A1, B1, A2 to the intermediate image sequence α, β, γ, δ. The method described with reference to FIGS. 5 to 7 in the above-mentioned European document EP 0 727 904 are, for example, suitable for this purpose for the low channel. The field α is produced by directly adopting the field A1, the fields β and δ are produced by respectively different median filtering from the fields A1, B1 and B1, A2, respectively, and the field y is produced by raster conversion, for example intermediate line interpolation from the field B1. The conversion is carried out by the device 3 (FIG. 1).

Furthermore, in the low channel, the fields A1, B1, A2 on the input side and the fields α, β, γ, δ in the intermediate image sequence are used to produce the output image sequence A, B, Γ, Δ composed of progressive images, as shown in FIG. 2. Each of the movement phases in the intermediate image sequence, which are represented by the fields α, β, γ, δ, is assigned an appropriate progressive output image. Furthermore, the movement phases of the images α, A and γ, Γ are assigned to the movement phase of the fields A1 and B1, respectively, on the input side; the movement phase of the images β, B is located between these movement phases mentioned above, and the movement phase of the images δ, Δ is located after these movement phases mentioned above, and between the movement phases of the fields B1, A2.

The progressive images are in general combined in such a manner that pixels that are to be produced and for which corresponding pixels are present in lines in the same raster in the fields of the same movement phase of the input image sequence or of the intermediate image sequence are adopted unchanged. For the examples, it is assumed that the movement vectors M are 0. For example, the pixel 100 in the line 1 of the progressive image A is taken at the appropriate point in the line 1 of the field A1, or alternatively at the appropriate point in the field α since, according to the method described in EP 0 727 904, the fields A1 and α are identical. The pixel 101 in the line 14 in the progressive image B is taken at the appropriate pixel point in line 14 of the intermediate field β. A corresponding situation applies to the pixel 104 in the progressive image Δ and to the pixels 102, 103 in the progressive image Γ in which case the fields B1, γ with the same movement phase are available for both raster positions.

A pixel is in each case produced by a suitable filtering measure for the other raster positions of the progressive images A, B, Δ for which no pixel with a corresponding raster position are available in the fields with the same movement phase. The pixel 105 in line 4 of the progressive image A has no corresponding pixel in the fields A1 or α, since these image lines are not used there. The pixel 105 is therefore produced by a filtering process 106. The filtering 106 is preferably median filtering with three input signals. The median filter 106 is supplied with those pixels from the field A1 on the input side and the intermediate field α which are immediately adjacent to the pixel point corresponding to the pixel 105 there, that is to say in the lines 3, 6 located immediately above and below this point. In the field A1, these pixels are denoted 116, 117. Furthermore, the median filter 106 is supplied with that pixel which is located at the pixel point, corresponding to the pixel 105, in the same raster position in the input field located in the most closely adjacent position. This is the pixel 108 in line 4 of field B1.

The pixel 107 in the progressive image B is produced by median filtering 118, to the input side of which those pixels 109, 110 are supplied which are located adjacent to that pixel point which corresponds to the pixel point 117 in the field β, as well as the pixel 117 in the field A1, which has the raster position of the field B and is located immediately before this in the movement phase.

The pixel 111 in the field Δ is produced by a median filter 112. This median filter is supplied on the input side with the pixels 113, 114 which are located immediately adjacent to the pixel point there corresponding to the pixel 111 in the other line raster, as well as the pixel 115 which is located at the point corresponding to the pixel point 111, with the same raster position, in the field A2. The field A2 is in this case that field on the input side which is located closest to the progressive image Δ movement phase, and has pixels in the same raster position as the pixel 111.

The median filters 106, 118, 112 in the low channel have a qualitative effect, in such a manner that, if there is little movement or no movement present, there is a relatively high probability of the respective pixel in the same raster, or else a pixel taken from an adjacent movement phase, being selected while, if movement is present, one of the pixels taken from the same movement phase but the other raster position is selected. Thus, when movement is present, the pixel generation character with the correct movement phase is dominant, while the character with the correct raster is dominant when no movement is present.

The conversion steps for the high channel are shown in FIG. 3. The intermediate image sequence α, β, γ, δ for the low channel is produced, for example, on the basis of the method described in conjunction with FIGS. 2 to 4 in EP-A2-0 727 904. Corresponding to FIG. 2, those pixels of the progressive frames for which pixels with the same raster are present in the fields with the same movement phase are formed by them. These are the pixels 120, . . . , 124. The other pixels are once again produced by median filtering.

The pixel 125 in the progressive image A is formed by median filtering 126. The median filter 126 is supplied on the input side with the pixel 127 from the field A1 or the corresponding pixel from the same field α which is located adjacent in the other raster to the corresponding pixel point to the pixel 125 in the field A1. Another input value 128 of the median filter 126 is located at the same pixel point as the pixel 125 in the field B1 with the next movement phase. If no movement or little movement is present between the fields A1, B1, the pixel 128 is supplied to the median filter 126 twice, by moving a changeover switch 129 to the "0" position. The movement is determined by a movement detection device 130 by evaluating the movement vectors provided by the movement vector estimator 5 (FIG. 1), and with a threshold value comparison being carried out, for example. If any movement is present (switch position "1"), a constant value, for example "0", is supplied (instead of the pixel 128) to the median filter 126.

In the progressive image B, the pixels 131 are produced by median filtering 132, since there are no pixels with this raster position in the field β with the same movement phase. For this purpose, the median filter 132 is supplied with the pixel 133 located adjacent to the corresponding point in the other raster position in the field β, and with the pixels 134 of the field A1 located at the corresponding point in the same raster position. If no movement is present, these pixels are supplied in duplicated form to the median filter 132, controlled by the movement detection 130, and if movement is present, the constant value "0" is supplied instead of this, and the pixel 134 with single weighting. In the progressive image Γ, the pixels 122, 123 are taken from the fields B1 and γ with the same movement phase, at the respective corresponding pixel point with the same raster position.

In the progressive image Δ, the pixel 135 is produced by median filtering 139. An input value for the median filter 139 is taken from the field δ with the same movement phase at a point 136 which is immediately adjacent to the pixel point 135 in the other raster position. Furthermore, the median filter 139 is supplied with the pixel 137 in the field A2, which is in the same raster position at the point corresponding to the pixel point 135, with the field A2 being that field on the input side which is located most closely adjacent to the progressive image δ and contains pixels in the same raster position as the pixel 135. Depending on the movement which is found between the fields B1, A2 on the input side by the movement detection device 138, the pixel 137 is supplied in duplicated form (no movement) or singly, in which case the constant value "0" is also fed in (movement).

The movement control applied to the median filters 126, 132, 139 means that, if there is little movement or no movement the pixels which dominate on the input side are those with the same raster as the pixel to be produced but which originate from the adjacent movement phase. On the other hand, once movement is present, the pixel at the input of the median filter, a pixel which is located adjacent to the pixel to be produced but in the other raster position, and the pixel in the same raster position in the adjacent movement phase are in competition. In consequence, without any movement, a pixel with the same raster is preferred by the median filter, if movement is present, the preferred pixel is that which best matches the image environment.

While the input-side pixel rate of the video signal Q and the input images A1, B1, A2 . . . with a frame refresh rate of 50 Hz is 13.5 MHz, the pixel rate for the progressive image sequence is 54 MHz. The line deflection frequency on the input side is 15625 Hz, and that on the output side is 62500 Hz. These frequencies can nowadays be processed without difficulty, inter alia in computer monitors.

We claim:

1. An image conversion method, which comprises: receiving an input image sequence composed of line-interlaced fields at a first repetition frequency;

converting the input image sequence to an output image sequence composed of progressive images at a second repetition frequency double the first repetition frequency; by producing from the input image sequence an intermediate image sequence composed of line-interlaced fields at the second repetition frequency;

filtering the fields in the intermediate image sequence and the fields in the input image sequence and producing therefrom the progressive images of the output image sequence.

2. The method according to claim 1, wherein the progressive images in the output image sequence are formed with lines in a first raster position and lines in a second raster position, and successive fields of the intermediate image sequence are each formed only with lines in a different raster position.

3. The method according to claim 1, which further comprises:

assigning one image in the intermediate image sequence and in the output image sequence respectively to a given movement phase of one of the images in the input image sequence and assigning one further image in the intermediate image sequence and in the output image sequence respectively to a further movement phase located between the given movement phases;

transferring the lines of an image in the intermediate image sequence into the lines in a corresponding raster position in the respective image in the output image sequence of a same movement phase; and obtaining one pixel in the lines in the other raster position of the image in the output image sequence by filtering to which, on an input side, at least one pixel in a line that is positionally adjacent the pixel to be produced in the image of the same movement phase in the intermediate image sequence is supplied and a pixel at a point positionally corresponding to the pixel to be produced in that image of the input image sequence which, in the given movement phase, is closest to the image of the output image sequence.

4. The method according to claim 3, which comprises splitting each of the image sequences into one image sequence having a high signal element containing high-frequency image elements and having a low signal element containing low-frequency image elements, and weighting those pixels from the input image sequence that are in the same raster position in comparison to the pixel to be produced more highly on the input side for the high signal element in the filtering if movement is found as compared to when no movement is found.

5. The method according to claim 3, wherein the filtering step comprises median filtering.

6. The method according to claim 5, wherein the median filtering step comprises supplying a first pixel to a median filter for the high signal element, the first pixel being taken from the field assigned to the intermediate image sequence in the movement phase on the line positionally adjacent to the pixel to be produced from the output image, taking a second pixel from the field in the input image sequence closest to the image of the output image sequence in the movement phase, from a point positionally corresponding to the pixel to be produced, together with the second pixel, if no movement is found, and a fixed value, if movement is found.

7. A circuit configuration for converting an input image sequence composed of line-interlaced fields at a first repetition frequency to an output image sequence composed of progressive images, comprising:

an input receiving an input video signal of an input image sequence composed of line-interlaced fields at a first repetition frequency;

a converter connected to said input for converting the input video signal into an intermediate video signal including an intermediate image sequence composed of line-interlaced fields at a second repetition frequency; and an output device connected to said converter for producing from the input video signal and the intermediate video signal an output video signal with an output image sequence composed of progressive images.

8. The circuit configuration according to claim 7, wherein said converter comprises a first image memory receiving the input video signal and outputting a first video signal at a double frame refresh rate, and a second image memory connected to receive from said first image memory the first video signal and outputting a second video signal delayed by one field relative to the first video signal, an intermediate video signal generator having an input connected to said first image memory and said second image memory for generating from the first and second video signals the intermediate video signal, and wherein said output device for producing the output video signal has an input connected an output of said first and second image memories and to an output of said generator.

* * * * *